United States Patent [19]

Marumoto et al.

[11] Patent Number: 5,473,261
[45] Date of Patent: Dec. 5, 1995

[54] INSPECTION APPARATUS AND METHOD FOR DISPLAY DEVICE

[75] Inventors: Hideji Marumoto, Kashiba; Nobuyuki Kawase, Tenri; Masasi Hosomi, Nara; Katsumi Irie, Kashihara; Koji Fukuda; Yuichiro Mochizuki, both of Tenri, all of Japan

[73] Assignee: Sharp Kabushiki Kaisha, Osaka, Japan

[21] Appl. No.: 255,917

[22] Filed: Jun. 7, 1994

[30] Foreign Application Priority Data

Jun. 11, 1993 [JP] Japan .................... 5-140668

[51] Int. Cl.$^6$ .................................................. G01R 31/00
[52] U.S. Cl. ........................... 324/770; 359/88; 359/54
[58] Field of Search ......................... 324/770; 359/88, 359/54, 55; 345/904

[56] References Cited

U.S. PATENT DOCUMENTS

| | | | |
|---|---|---|---|
| 5,311,342 | 5/1994 | Watanabe | 359/88 |
| 5,339,093 | 8/1994 | Kumagai et al. | 324/770 |

FOREIGN PATENT DOCUMENTS

| | | |
|---|---|---|
| 63-123093 | 5/1988 | Japan . |
| 1-96572 | 4/1989 | Japan . |
| 1-142594 | 6/1989 | Japan . |
| 2-59727 | 2/1990 | Japan . |
| 2-198425 | 8/1990 | Japan . |

Primary Examiner—Kenneth A. Wieder
Assistant Examiner—Kourosh Cyrus Khosravi
Attorney, Agent, or Firm—Nixon & Vanderhye

[57] ABSTRACT

The inspection apparatus of the invention inspects a display device including first and second bus lines formed on an active matrix substrate. The inspection apparatus includes a first substrate unit and a second substrate unit each having a pair of substrates and connecting films therebetween. On one substrate of each substrate unit, inspection terminals and first inspection lines are formed and each of the inspection lines are connected to one of the inspection terminals. On the other substrate of each substrate unit, second inspection lines are provided. The first and second inspection lines of the substrates are selectively connected by the connecting films. During inspection, the second inspection lines of the first substrate unit are brought directly in contact with the first bus lines, so that each of the first bus lines is connected to one of the inspection terminals of the first substrate unit. Each of the second bus lines is connected to one of the inspection terminals of the second substrate unit via the respective second inspection lines in the same way. The apparatus further includes: a driving signal input circuit for supplying driving signals for a display inspection of the display device to the inspection terminals of each substrate unit; a resistance measuring device for measuring resistances of the first and second bus lines of the display device; and a section for connecting either of the driving signal input circuit or the resistance measuring device to the first and second substrate unit.

11 Claims, 10 Drawing Sheets

5,473,261

INSPECTION APPARATUS AND METHOD FOR DISPLAY DEVICE

BACKGROUND OF THE INVENTION

1. Field of the Invention

The present invention relates to an inspection apparatus and an inspection method for a display device. More particularly, the present invention relates to an inspection apparatus and an inspection method for inspecting a display device as to display ability and for inspecting lines provided on each substrate of the display device for short circuits between lines and breakage of each line, and also for measuring line resistances.

2. Description of the Related Art

In recent years, as a flat panel display alternative to a cathode ray tube (CRT), a liquid crystal display (LCD) has become widely used. Among various types of LCDs, an active matrix driving type LCD in which a switching element is provided for each picture element is popular for practical use, this is because of its convenient size, its display characteristics which are as good as a CRT, its low power consumption, and the like.

An active matrix driving type LCD includes an active matrix substrate and a counter substrate which is disposed so as to face the active matrix substrate. A liquid crystal layer is sandwiched between the substrates. FIG. 10 shows an exemplary active matrix substrate 20. The active matrix substrate 20 has a transparent and insulating base substrate made of glass or the like, a plurality of parallel gate bus lines 24 on the base substrate, and a plurality of parallel source bus lines 22 which are perpendicular to the gate bus lines 24. In each area surrounded by two adjacent gate bus lines 24 and two adjacent source bus lines 22, a pixel electrode 26 and a switching element 25 are provided. In this case, as the switching element 25, a thin film transistor (TFT) which is a three-terminal element is used. The switching element 25 is connected to a gate bus line 24, a source bus line 22, and a pixel electrode 26. In addition, on the base substrate, short rings 29 are formed in order to prevent the switching elements 25 from being electrically destroyed by static electricity which may occur in the production process. In FIG. 10, for example, the short rings 29 are formed for every other terminal 23 of adjacent gate bus lines 24.

In the active matrix type, a charge is held by the liquid crystal which functions as a pixel capacitance. However, since the pixel capacitance is small, the charge may be insufficiently held or it may be easily influenced by a parasitic capacitance. For avoiding such disadvantages, an auxiliary capacitance 27 is provided in parallel to the pixel capacitance. The active matrix substrate 20 in FIG. 10 is of a Cs-On-Gate type, and the auxiliary capacitance 27 is formed between the pixel electrode 26 and the gate bus line 24. On an inner face of the counter substrate (not shown) which is disposed so as to face the active matrix substrate 20, counter electrodes 28 are provided so as to face respective pixel electrodes 26.

In the LCD having the active matrix substrate 20 shown in FIG. 10, when the switching element 25 is turned ON in accordance with a scanning signal applied to the gate bus line 24, an electric continuity between the pixel electrode 26 and the source bus line 22 is made, and a signal voltage applied to the source bus line 22 is applied to the liquid crystal layer between the pixel electrode 26 and the counter electrode 28. In this way, the optical characteristics of the portion of the liquid crystal layer to which the voltage is applied are changed depending on an image to be displayed. The light which has passed through the liquid crystal layer having such partially changed optical characteristics is perceived by a viewer as an image.

In the final step of the production process of the active matrix substrate 20, the characteristic inspection of the switching element 25, and the inspections such as the measurement of the resistances of bus lines 22 and 24 and the detection of short circuits and line breakage are performed. As the result of these inspections, the completed active matrix substrates are determined to be good or defective. The active matrix substrates found to be good are sent to the next process, i.e., a so-called subsequent process. Among the active matrix substrates which are determined to be defective, active matrix substrates which can be repaired are repaired with optical energy irradiation using a laser or the like, and then inspected again. In the subsequent process, the active matrix substrate 20 is attached to the counter substrate on which the counter electrodes 28 are formed. Liquid crystal as a display medium is injected between the attached substrates. Then, the attached substrates are cut to have a predetermined size, so that a display device is produced. In this cutting step, the portion of the base substrate on which the short rings 29 are provided is cut off.

For the thus assembled display device, various kinds of inspections are performed again, because it is impossible to thoroughly detect all of the failures such as defective pixels in the display device immediately after the active matrix substrate is produced and before it is assembled into the display device. The display inspection is performed by inputting driving signals into the display device on which a driving circuit is installed, or prior to the installation of the driving circuit onto the display device. In the latter case where the driving circuit is not installed, contact media such as contact pins or probe cards are brought into contact with the terminals 23 of the gate bus lines 24, the terminals 21 of the source bus lines 22, and terminals 30, so that display signals are externally input to the gate bus lines 24 and the source bus lines 22. Thus, the presence of luminescent spots/lines on the display device is checked. A luminescent spot appears due to a short circuit between a gate bus line 24 or a source bus line 22 and a drain electrode of a switching element 25 (i.e., to a pixel electrode 26), a short circuit between a pixel electrode 26 and a counter electrode 28, and the like. A luminescent line appears due to a short circuit between a gate bus line 24 and a source bus line 22, a line breakage of a gate bus line 24 or a source bus line 22, or a short circuit between gate bus lines 24.

Along with the above-described display inspection for the display device, a line inspection for inspecting the display device as to the electric characteristics of respective lines and respective terminals of the display device is performed. In the line inspection, the resistances between bus lines 22 and 24 provided on the active matrix substrate 20 are measured, whereby the presence of any short circuit between bus lines and any breakage of bus lines is checked. A short circuit between bus lines in the middle of the bus lines and a line breakage of any one bus line may cause a display failure. If the short rings 29 are not cut from the active matrix substrate 20, the driving circuit is installed on the display device while the terminals are short-circuited. This, as well as the short circuit between bus lines and the breakage of a bus line, may also cause a display failure.

In all of the inspections for the display failure such as luminescent points or lines, and display failure caused by the short circuit between bus line terminals due to the short ring 29 remaining on the active matrix substrate 20, the short circuit between bus lines in the middle of the bus lines, and the line breakage of each bus line, contact media such as contact pins or a flexible print board are brought into contact with all of the input terminals of the respective bus lines of the display device. Each of the contact pins are sequentially connected to a relay, so that an area to be inspected is selected, and the selected area is inspected. When the inspection for one area to be inspected is completed, another area is selected for the inspection, and the same inspection is performed.

However, in the inspection method as described above, contact pins are sequentially connected to the relay one by one, so that the cost of the inspection apparatus is greatly increased, and the maintenance of the apparatus is difficult. In addition, when the inspections are changed from the display inspection to the line inspection, or when lines or terminals between which the resistance is to be measured are changed in the line inspection, the contact media should be connected to the terminals of the display device to be inspected at every change. Moreover, if the contact media are connected to the respective terminals of the display device to be inspected at every change of inspections, the inspection efficiency is very poor.

SUMMARY OF THE INVENTION

The inspection apparatus of this invention inspects a display device including an active matrix substrate, a counter substrate, and a display medium interposed between the active matrix substrate and the counter substrate, the active matrix substrate having a plurality of first bus lines and a plurality of second bus lines formed thereon. The apparatus includes a first substrate unit and a second substrate unit. The first substrate unit includes a plurality of first inspection terminals, a plurality of first inspection lines, a plurality of second inspection lines, and first supporting means for supporting the inspection terminals and lines, each of the first inspection lines being connected to one of the first inspection terminals, the second inspection lines being provided on a face of the first supporting means which is different from a face thereof on which the first inspection lines are provided, each of the second inspection lines being selectively connected to one of the first inspection lines by first connecting means, wherein when the second inspection lines are brought directly in contact with the first bus lines, each of the first bus lines is connected to one of the first inspection terminals. The second substrate unit includes a plurality of second inspection terminals, a plurality of third inspection lines, a plurality of fourth inspection lines, and second supporting means for supporting the inspection terminals and lines, each of the third inspection lines being connected to one of the second inspection terminals, the fourth inspection lines being provided on a face of the second supporting means which is different from a face thereof on which the third inspection lines are provided, each of the fourth inspection lines being selectively connected to one of the third inspection lines by second connecting means, wherein when the fourth inspection lines are brought directly in contact with the second bus lines, each of the second bus lines is connected to one of the second inspection terminals. The inspection apparatus further includes: driving signal input means for supplying driving signals for performing a display inspection of the display device to the first inspection terminals and the second inspection terminals; resistance measuring means for measuring resistances of the first bus lines and the second bus lines of the display device; and means for connecting either of the driving signal input means or the resistance measuring means to the first substrate unit and the second substrate unit.

In one embodiment of the invention, the first supporting means includes a first substrate and a second substrate, the first inspection terminals and the first inspection lines being provided on the first substrate, the second inspection lines being provided on the second substrate, the first substrate and the second substrate being disposed to allow the first inspection lines to face the second inspection lines, and a conductive film as the first connecting means being formed between the first substrate and the second substrate.

In another embodiment of the invention, the second supporting means includes a third substrate and a fourth substrate, the second inspection terminals and the third inspection lines being provided on the third substrate, the fourth inspection lines being provided on the fourth substrate, the third substrate and the fourth substrate being disposed to allow the third inspection lines to face the fourth inspection lines, and a conductive film as the second connecting means being formed between the third substrate and the fourth substrate.

In another embodiment of the invention, the number of the first inspection terminals is predetermined, the first inspection lines are divided into groups, the number of groups being equal to the predetermined number of the first inspection terminals, and a group of the first inspection lines is connected to one first inspection terminal which is different from a first inspection terminal to which another group of the first inspection lines is connected.

In another embodiment of the invention, the number of the second inspection terminals is predetermined, the third inspection lines are divided into groups, the number of groups being equal to the predetermined number of the second inspection terminals, and a group of the third inspection lines is connected to one second inspection terminal which is different from a second inspection terminal to which another group of the third inspection lines is connected.

In another embodiment of the invention, the second inspection lines and the fourth inspection lines are formed at the same pitches as those of the first bus lines and the second bus lines, respectively.

According to another aspect of the invention, a method for inspecting a display device using the above-described apparatus is provided. The method includes the steps of: connecting the first substrate unit to the display device to align the second inspection lines and the first bus lines, and connecting the second substrate unit to the display device to align the fourth inspection lines and the second bus lines; and switching a mode of the inspection apparatus between a mode for checking the display device as to a display state thereof and a mode for measuring resistances between the first bus lines and the second bus lines.

Thus, the invention described herein makes possible the advantage of providing an inspection apparatus for a display device which can efficiently perform inspections and an inspection method used in the apparatus.

This and other advantages of the present invention will become apparent to those skilled in the art upon reading and understanding the following detailed description with reference to the accompanying figures.

DESCRIPTION OF THE PREFERRED EMBODIMENTS

Figure 1:
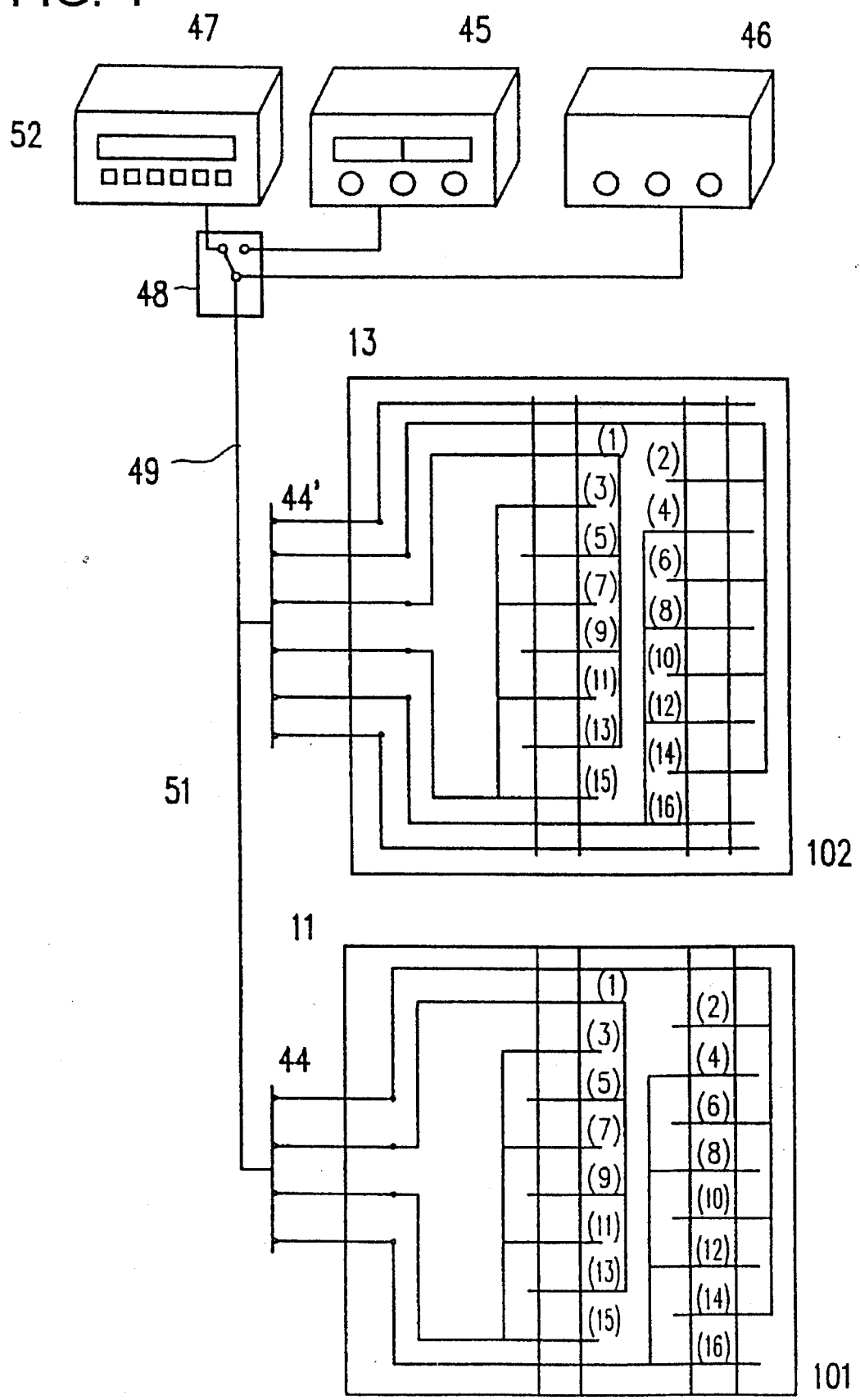
FIG. 1 schematically shows the construction of an inspection apparatus of this invention.
Figure 10:
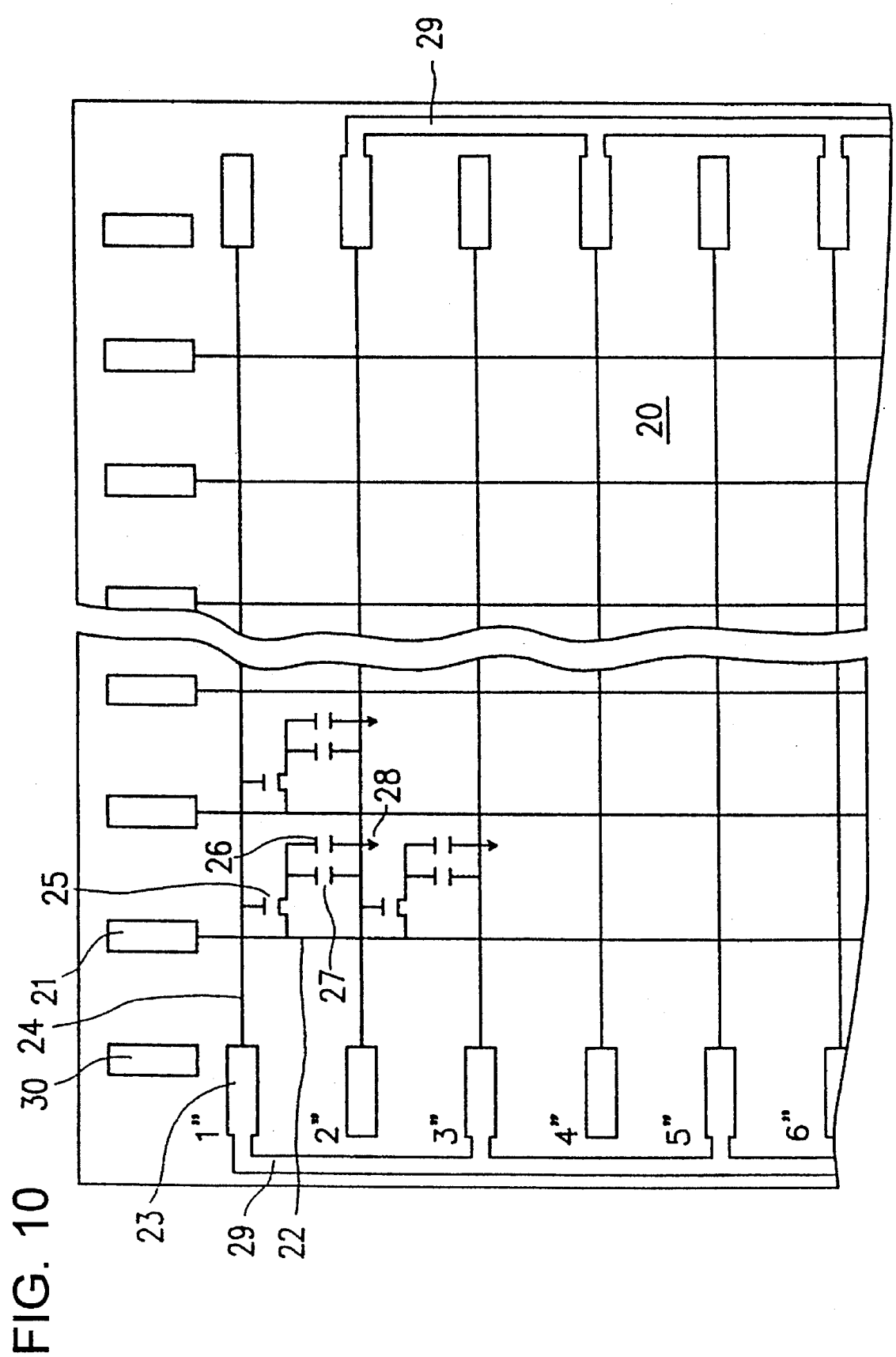
FIG. 10 is a plan view of an active matrix substrate provided with a short ring.

Hereinafter, an inspection apparatus and an inspection method according to the invention will be described with reference to the accompanying drawings. FIG. 1 schematically shows the construction of the inspection apparatus of the invention. The inspection apparatus includes an inspecting substrate section 51 and a peripheral measurement section 52 thereof. The inspecting substrate section 51 includes a first substrate unit 101 and a second substrate unit 102 which has substantially the same construction as that of the first substrate unit 101. This example describes the case where a display device having an active matrix substrate with the construction shown in FIG. 10 is to be inspected.

Figure 2:
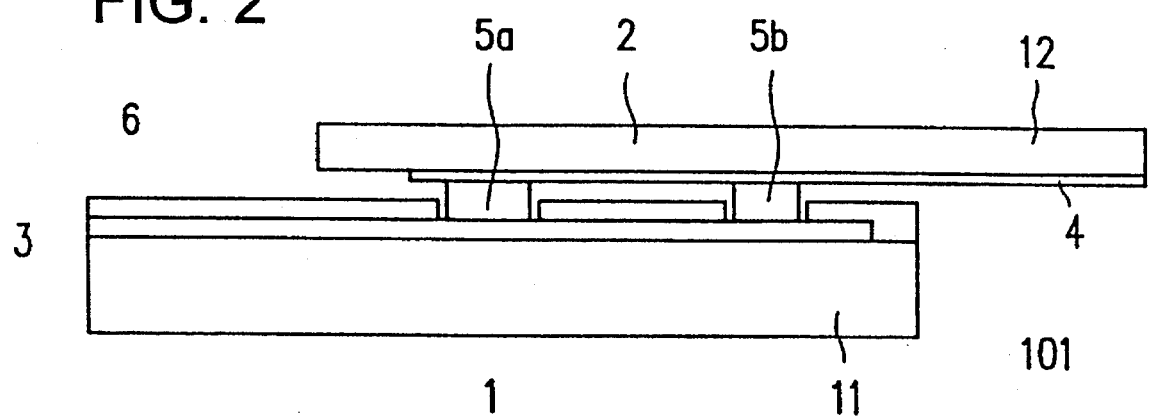
FIG. 2 is a cross-sectional view showing a first substrate unit of the inspection apparatus in FIG. 1.

FIG. 2 shows a cross section of the first substrate unit 101. As is shown in FIG. 2, the first substrate unit 101 includes a first substrate 11 and a second substrate 12. On one face of the first substrate 11, inspection lines 3 in a predetermined pattern are formed. On one face of the second substrate 12, inspection lines 4 in a predetermined pattern are formed. The substrates 11 and 12 are disposed so as to face each other in such a manner that the faces on which the inspection lines 3 and 4 are formed face each other. However, the face of the second substrate 12 on which the inspection lines 4 are formed does not perfectly face the face of the first substrate 11. As is shown in FIG. 2, a portion of the second substrate 12 does not face the first substrate 11. Between the substrates 11 and 12, anisotropic conductive films 5a and 5b are interposed. Each of the anisotropic conductive films 5a and 5b has a conductive property in the thickness direction and has an insulating property in a direction parallel to the face of the substrate on which the inspection line is formed (hereinafter, referred to as a face direction). The anisotropic conductive films 5a and 5b are heated and pressed between the first substrate 11 and second substrate 12, so as to provide an electrical connection between the inspection lines 3 and the inspection lines 4. In addition, on the face of the first substrate 11 on which the inspection lines 3 are formed, an insulating film 6 is formed so as to cover the inspection lines 3 excluding the portion where the anisotropic conductive films 5a and 5b are formed.

Figure 3A:
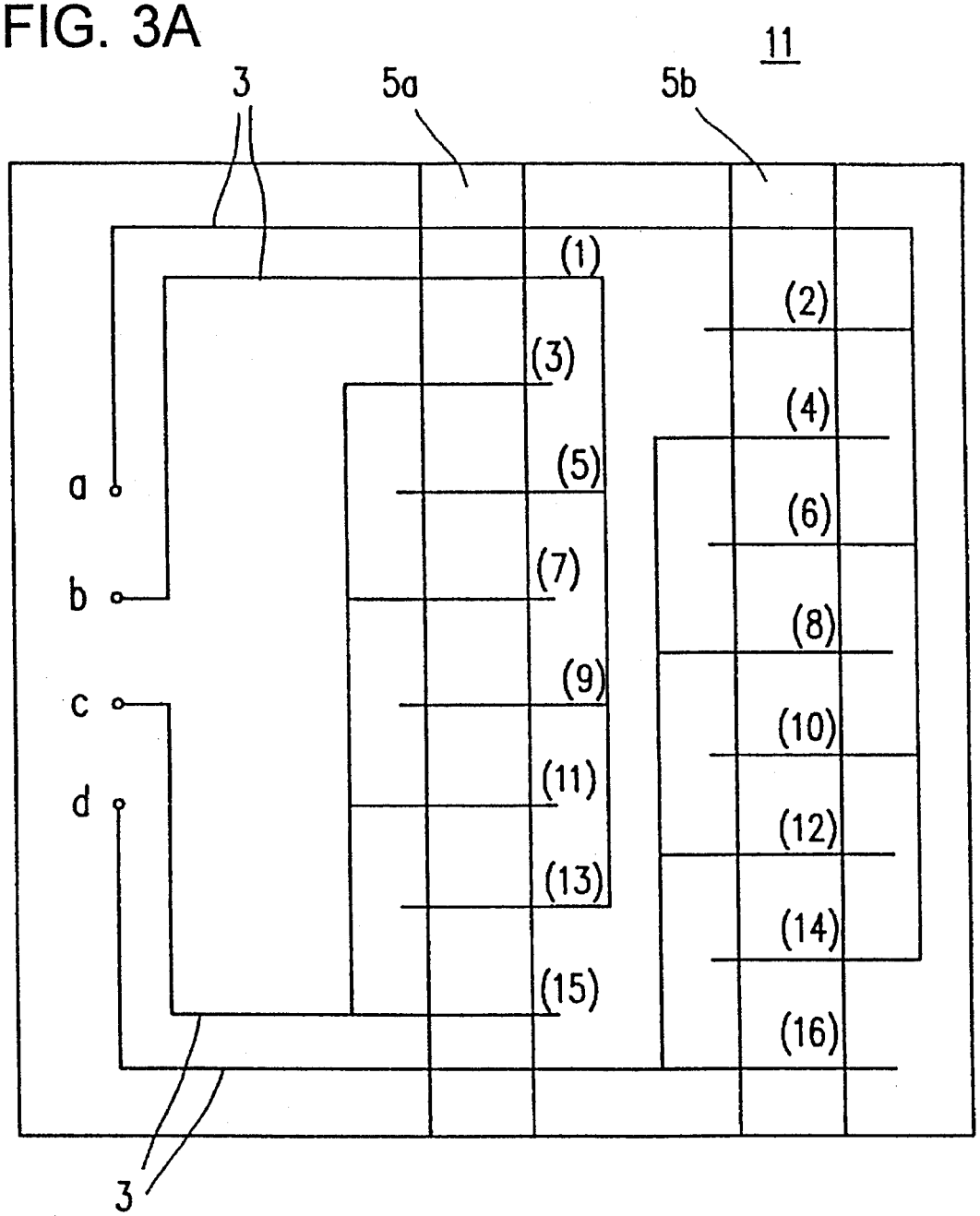
FIGS. 3A and 3B are a plan view and a cross-sectional view of a first substrate, respectively.
Figure 3B:
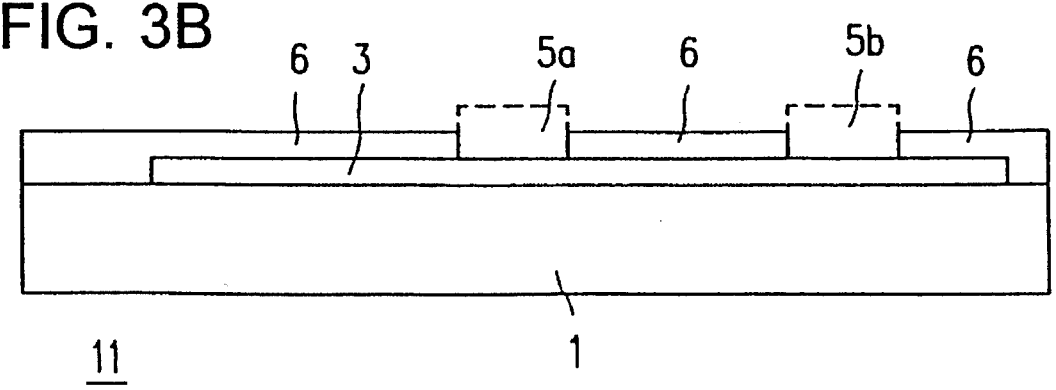

FIGS. 3A and 3B are a plan view and a cross-sectional view, respectively, of the first substrate 11. The first substrate 11 includes a base substrate 1, and the inspection lines 3 are provided on the base substrate 1. As the base substrate 1, for example, a glass epoxy resin film is used. On the surface thereof, the inspection lines 3 made of copper or the like are formed. In general, several hundreds of inspection lines 3 are formed. Herein, for facilitating the description, only sixteen inspection lines 3 are formed. For the same reason, it is also assumed that sixteen inspection lines 4 are formed on the second substrate 12.

The inspection lines 3 are divided into four blocks which are connected to inspection connecting terminals a, b, c, and d, respectively. Specifically, to each of the inspection connecting terminals a, b, c, and d, one line is connected, and the line is branched into four lines. As a result, on the base substrate 1, sixteen inspection lines are formed as is shown in FIG. 3A. The sixteen inspection lines are disposed parallel to each other at the same interval as that of the gate bus lines 24 and the source bus lines 22 of the display device to be inspected. Herein, the sixteen inspection lines 3 correspond to the first to sixteenth gate bus lines which are shown from the top to bottom in FIG. 3A, respectively. In other words, the four inspection lines connected to the inspection connecting terminal a correspond to the second, sixth, tenth, and fourteenth gate bus lines 24, respectively. The inspection lines connected to the inspection connecting terminal b correspond to the first, fifth, ninth, and thirteenth gate bus lines 24, respectively. The inspection lines connected to the inspection connecting terminal c correspond to the third, seventh, eleventh, and fifteenth gate bus lines 24, respectively. The inspection lines connected to the inspection connecting terminal d correspond to the fourth, eighth, twelfth, and sixteenth gate bus lines 24, respectively.

As to the anisotropic conductive films 5a and 5b formed on the inspection lines 3, as is shown in FIG. 3B, the anisotropic conductive film 5a is formed on the eight inspection lines connected to the inspection connecting terminals b and c, and the anisotropic conductive film 5b is formed on the eight inspection lines connected to the inspection connecting terminals a and d.

Figure 4A:
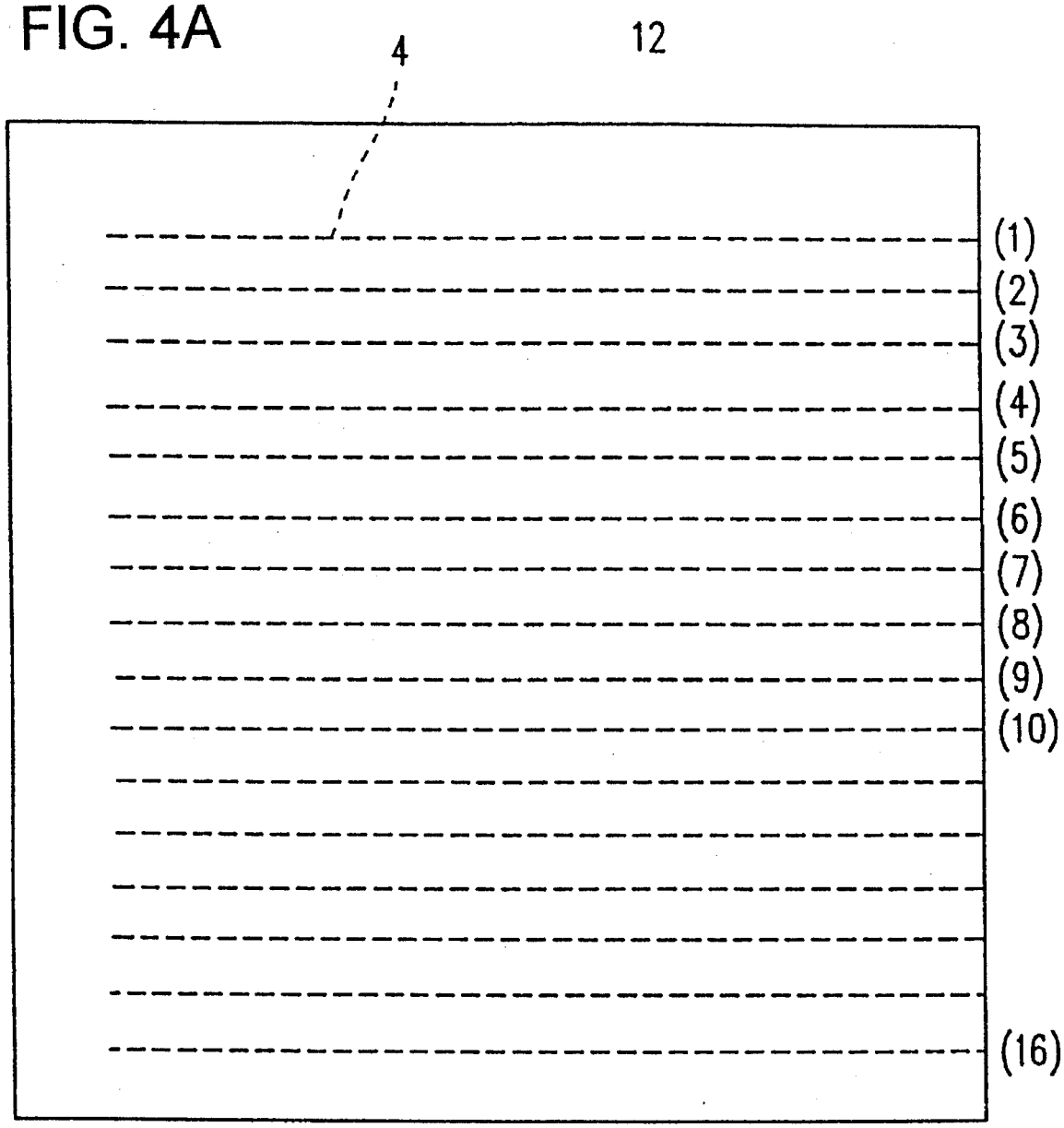
FIGS. 4A and 4B are a plan view and a cross-sectional view of a second substrate, respectively.
Figure 4B:
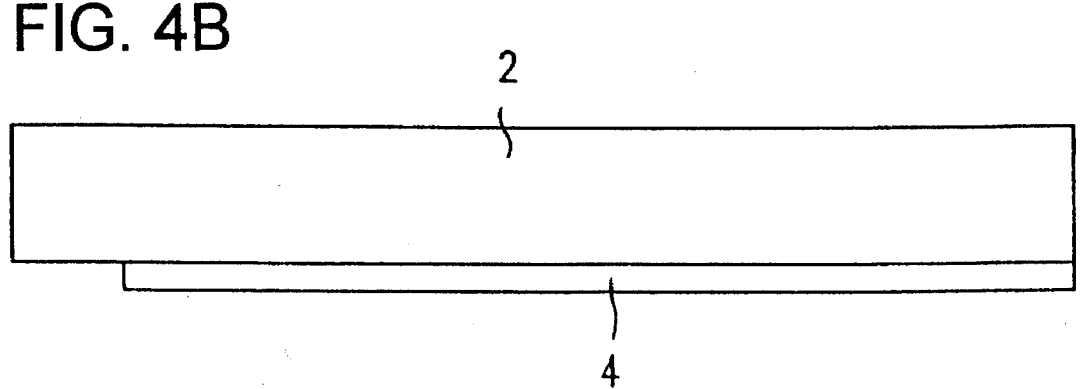

FIGS. 4A and 4B are a plan view and a cross-sectional view, respectively, of the second substrate 12. The second substrate 12 includes a base substrate 2 made of, for example, a glass epoxy resin, the same as in the first substrate 11. On one face of the base substrate 2, the inspection lines 4 are formed in the predetermined pattern. The pattern of the inspection lines 4 is the same as that of the gate bus lines 24 of the display device to be inspected. As the material of the inspection lines 4, for example, copper is used. In general, several hundreds of inspection lines 4 are formed in the same way of the inspection lines 3. Herein, only sixteen inspection lines are provided so as to correspond to the first to sixteenth gate bus lines 24.

The second substrate 12 having the above construction is disposed so as to face the first substrate 11 with the anisotropic conductive films 5a and 5b interposed therebetween. At this time, the inspection lines 3 connected to the inspection connecting terminals a and d on the first substrate 1 correspond to the even-numbered inspection lines 4 on the second substrate 12, and the inspection lines 3 connected to the inspection connecting terminals b and c correspond to the odd-numbered inspection lines 4. As described above, the second substrate 12 does not entirely face the first substrate 11, but a portion of the second substrate 12 does face the first substrate 11. As is shown in FIG. 2, the positions of the first substrate 11 and the second substrate 12 are shifted from each other, so that the portion of the first substrate 11 in which the inspection connecting terminals a to d are provided is not covered with the second substrate 12, and portions of the inspection lines 4 on the second substrate 12 are not covered with the first substrate 11. That is, the not-covered portions are exposed.

By referring to FIGS. 5A, 5B, 6A, and 6B, the construction of the second substrate unit 102 is described. The second substrate unit 102 includes a third substrate 13 and a fourth substrate 14. On one face of the third substrate 13, inspection lines 3' are formed. On one face of the fourth substrate 14, inspection lines 4' are formed. The third and fourth substrates 13 and 14 are disposed so as to face each other in such a manner that the faces on which the inspection lines 3' and 4' are formed face each other. Also, the third substrate 13 and the fourth substrate 14 are shifted from., each other in the same way as in the first and second substrates 11 and 12 of the first substrate unit 101. Between the third substrate 13 and the fourth substrate 14, anisotropic conductive films 5a' and 5b' are interposed. The anisotropic conductive films 5a' and 5b' are used for providing an electrical connection between the inspection lines 3' and the inspection lines 4'. The construction of the second substrate unit 102 is substantially the same as that of the first substrate unit 101, so the description thereof is omitted.

Figure 5A:
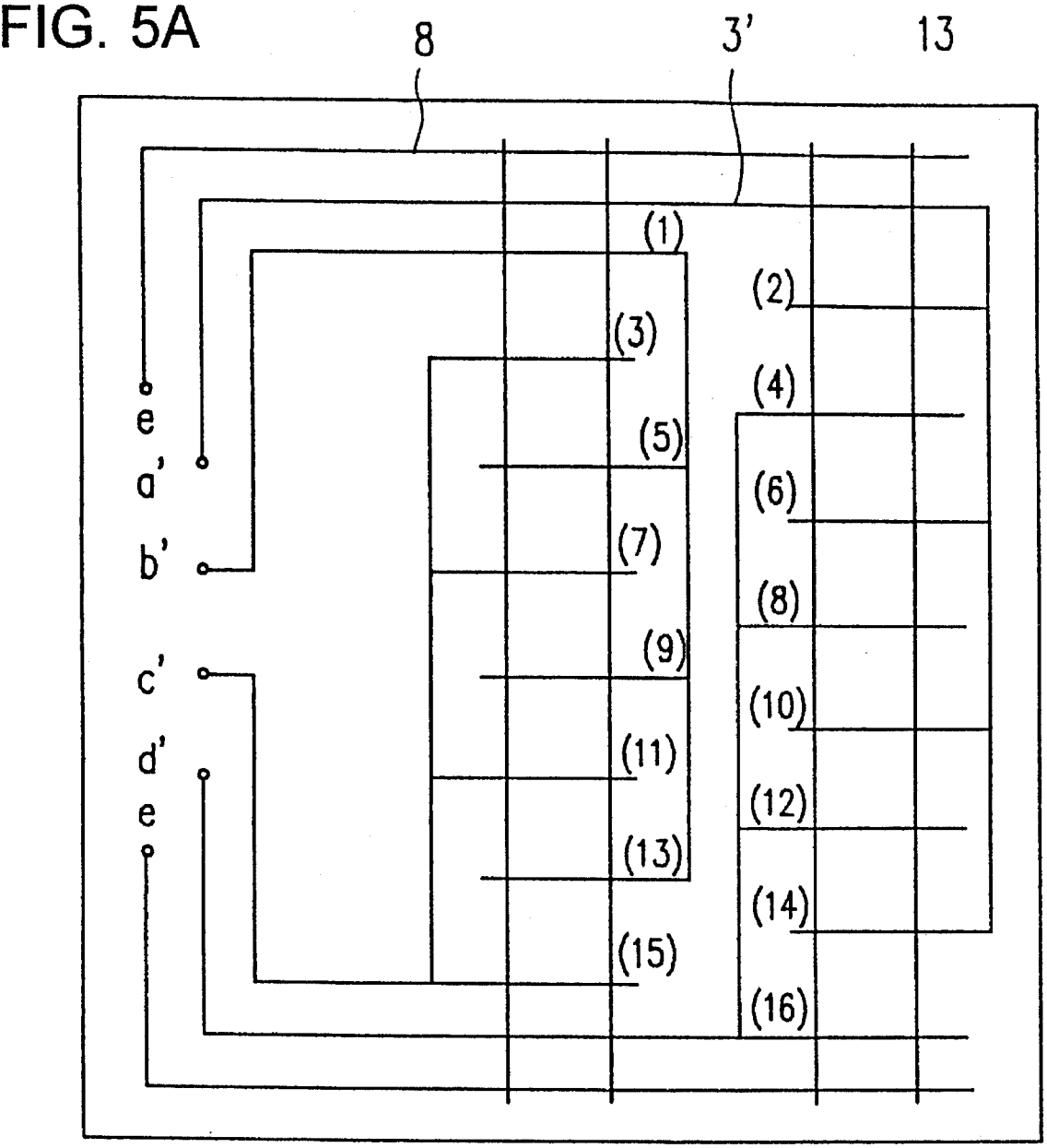
FIGS. 5A and 5B are a plan view and a cross-sectional view of a third substrate, respectively.
Figure 5B:
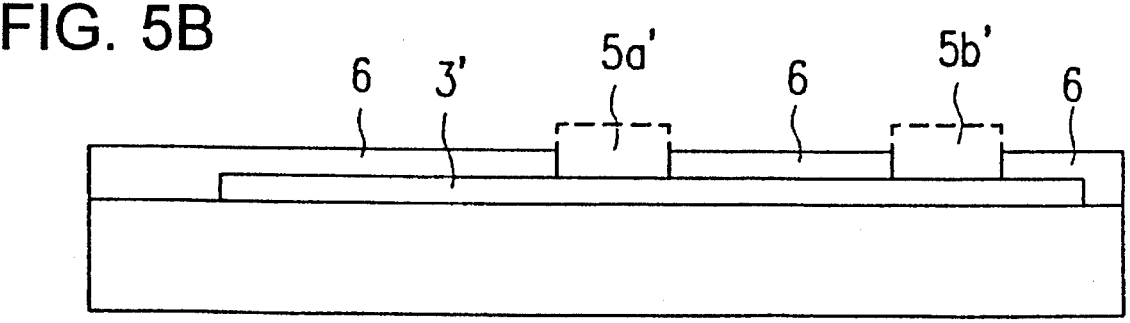
Figure 6A:
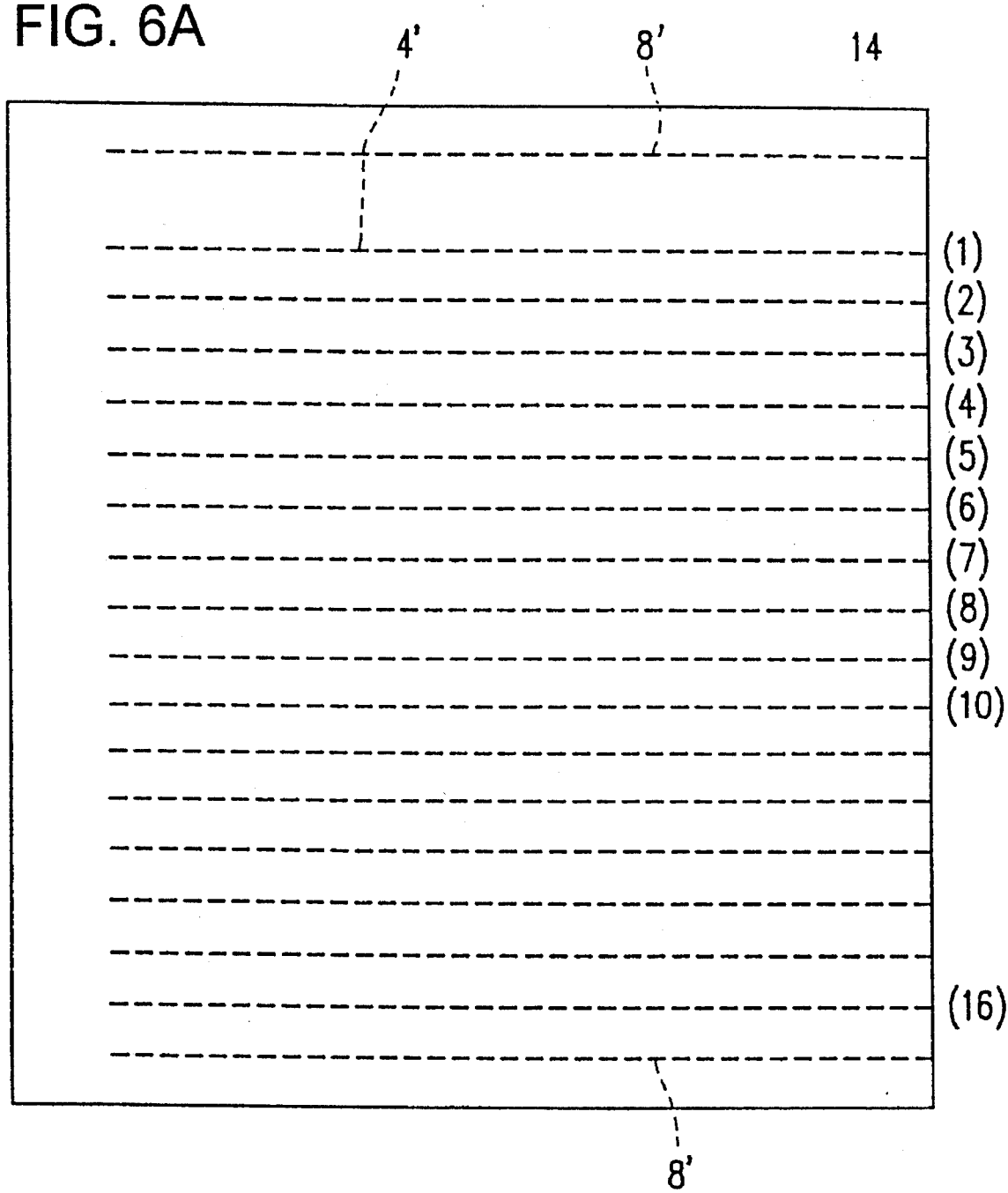
FIGS. 6A and 6B are a plan view and a cross-sectional view of a fourth substrate, respectively.
Figure 6B:
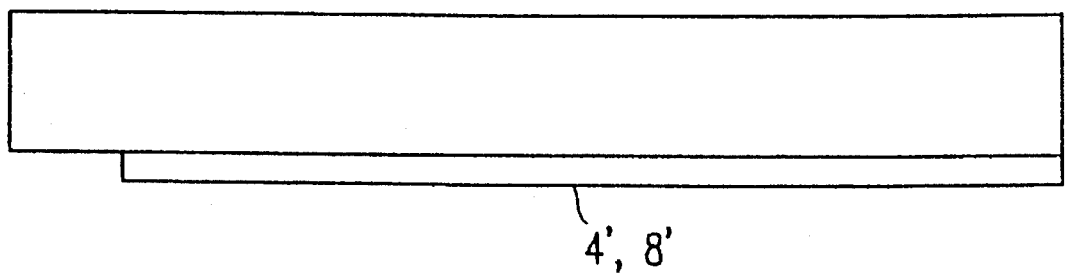

The construction of the third substrate 13 is shown in FIGS. 5A and 5B. The construction of the fourth substrate 14 is shown in FIGS. 6A and 6B.

As is shown in FIG. 5A, in the same way as in the first substrate 11, the inspection lines 3' on the third substrate 13 are provided in such a manner that four inspection lines are connected to each of the inspection connecting terminals a', b', c', and d'. The sixteen inspection lines are formed parallel to each other so as to correspond to the sixteen source bus lines 22. The third substrate 13 is different from the first substrate 11 in that inspection lines 8 corresponding to common terminals of the counter electrodes of the display device and inspection connecting terminals e to which the inspection lines 8 are connected are provided on the third substrate 13 in addition to the inspection connecting terminals to which the inspection lines corresponding to the bus lines of the display device.

On the fourth substrate 14, in the same way as in the second substrate 12, the inspection lines 4' are formed parallel to each other at the same interval as the source bus lines 22 so as to correspond to the source bus lines 22. The fourth substrate 14 is different from the second substrate 12 in that inspection lines 8' corresponding to the common terminals of the counter electrodes are formed on the fourth substrate 14 in addition to the inspection lines 4' corresponding to the source bus lines of the display device. In the same way as in the first substrate 11 and the second substrate 12, the third substrate 13 and the fourth substrate 14 are shifted from each other. Accordingly, the inspection connecting terminals a' to d' and e on the third substrate 13 remain exposed without being covered with the fourth substrate 14. Also, portions of the inspection lines 4' and 8' on the fourth substrate 14 remain exposed without being covered with the third substrate 13.

Figure 7A:
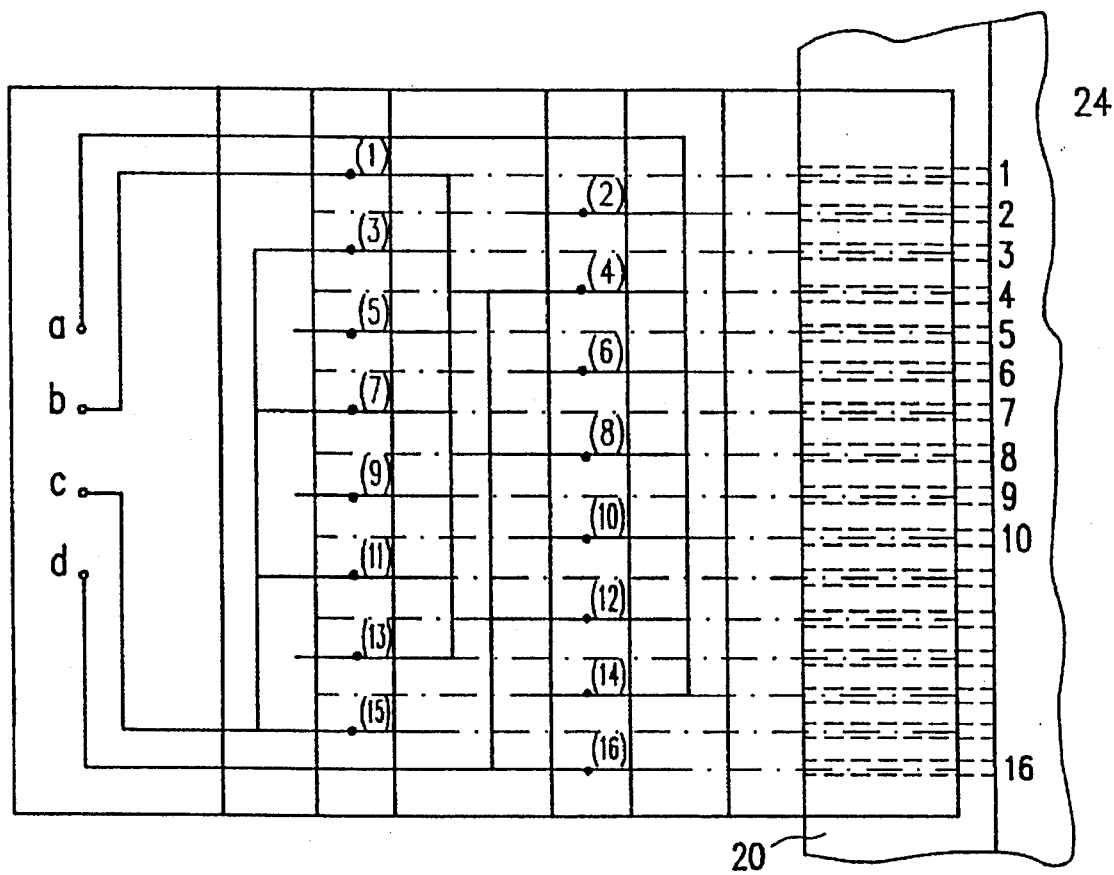
FIGS. 7A and 7B are a plan view and a cross-sectional view, respectively, for illustrating the positional relationship among the first substrate, the second substrate, and the display device during the inspection.
Figure 7B:
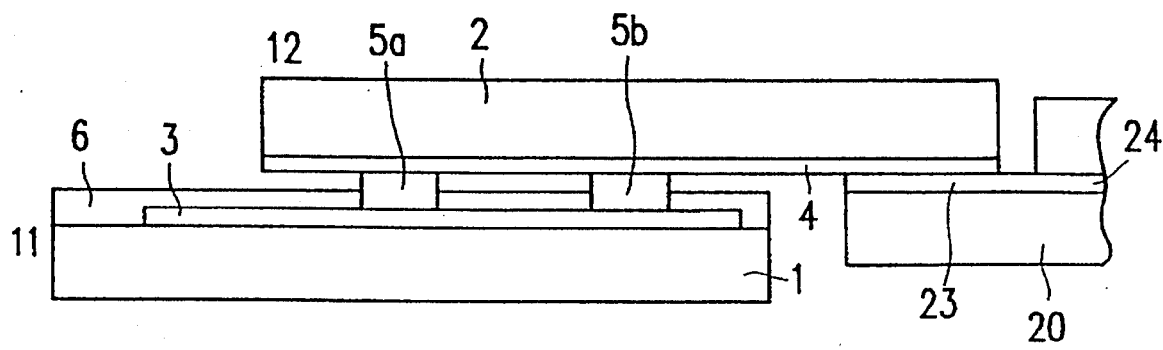
Figure 8A:
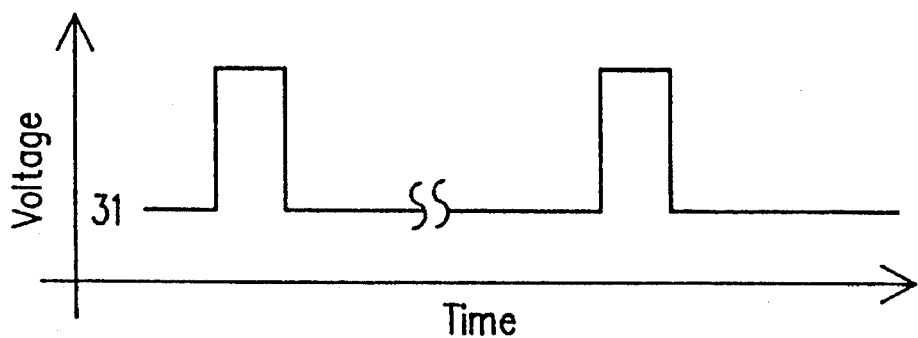
FIG. 8 shows waveforms of signals input into the display device during the display inspection.
Figure 8B:
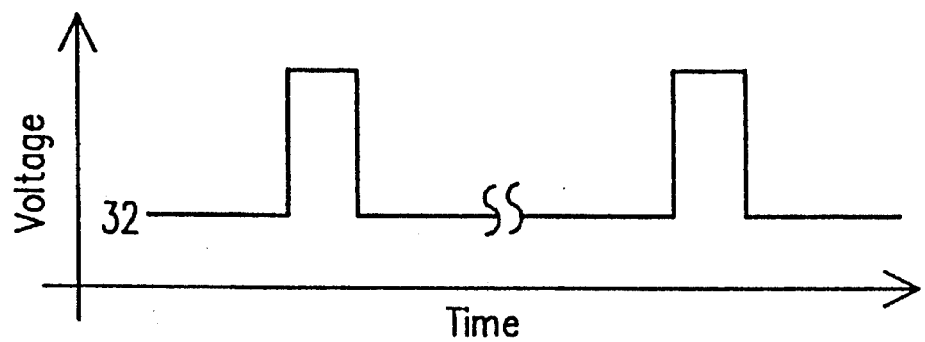
Figure 8C:
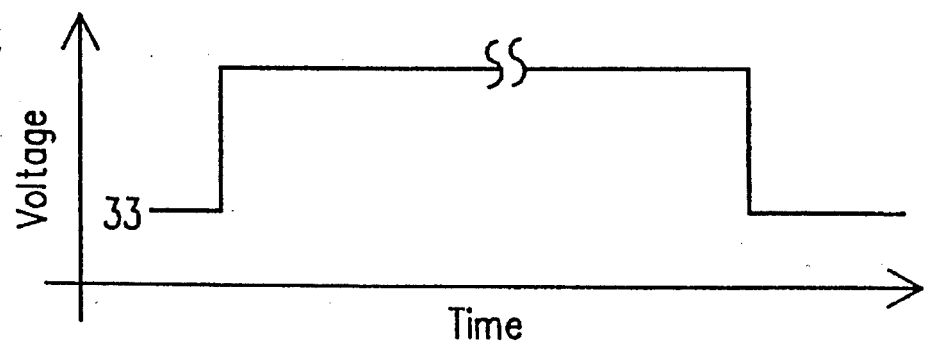
Figure 8D:
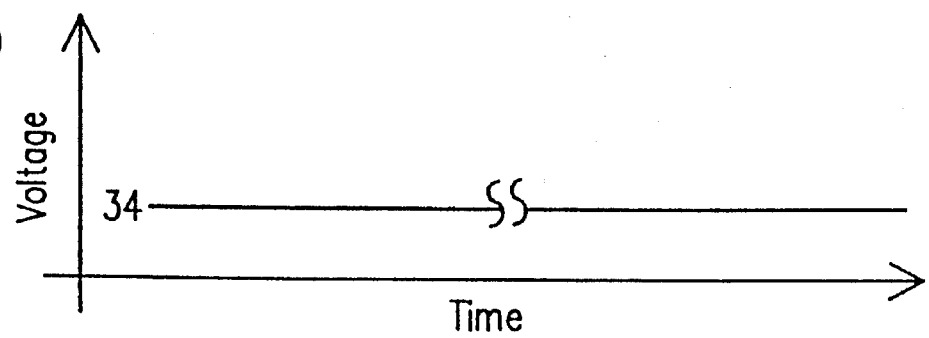

Next, the connection among the first substrate unit 101, the second substrate unit 102, and the active matrix substrate 20 of the display device will be described. During the inspection, as is shown in FIG. 7A, the exposed portions of the inspection lines 4 on the second substrate 12 of the first substrate unit 101 are brought into contact with the gate bus line terminals 23 on the active matrix substrate 20. As a result, the inspection connecting terminals a to d of the first substrate unit 101 are connected to the gate bus line terminals 23 via the inspection lines 3 on the first substrate 1 and via the inspection lines 4 which are electrically connected to the inspection lines 3 through the anisotropic conductive films 5a and 5b. Although not shown in the figures, also in the second substrate unit 102, during the inspection, the exposed portions of the inspection lines 4' on the fourth substrate 14 are brought into contact with the source bus line terminals 21, and the inspection lines 8' are brought into contact with the counter electrode common terminals 30. As a result, the inspection connecting terminals a' to d' of the second substrate unit 102 are electrically connected to the source bus line terminals 21 via the inspection lines 3', the anisotropic conductive films 5a' and 5b', and the inspection lines 4'. The inspection connecting terminals e are connected to the counter electrode common terminals 30. The display inspection and the resistance measurement are performed in the condition where the first and second substrate units 101 and 102 are connected to the display device to be inspected.

During the display inspection, a driving signal input into the inspection connecting terminal a is transmitted to the second, sixth, tenth, and fourteenth inspection lines 4, via the inspection lines 3 numbered as (2), (6), (10), and (14), and through the anisotropic conductive films 5b. Then, the driving signal is applied to the second, sixth, tenth, and fourteenth gate bus line terminals 23 which are directly in contact with these inspection lines 4. Also, driving signals input into the inspection connecting terminals b, c, and d are applied to the gate bus line terminals 23 via the corresponding inspection lines 4. Also, signals applied to the inspection connecting terminals a' to d' and e of the second substrate unit 102 are applied to the corresponding source bus line terminals 21 and the counter electrode common terminals 30 via the inspection lines 4' and 8, respectively.

Next, the measurement section 52 of the inspection apparatus of this invention is described. As is shown in FIG. 1, the measurement section 52 includes a driving signal input circuit 45 for supplying a driving signal for the display inspection to the substrate units 101 and 102, a resistance measuring device 47 for measuring the resistances between respective terminals and for detecting short circuits between bus lines or the like, and a control computer 46 for controlling a switch 48 which selectively connects one of the driving signal input circuit 45 and the resistance measuring device 47 to the inspecting substrate section 51. Two terminals of the switch 48 are connected to the driving signal input circuit 45 and the resistance measuring device 47, respectively. The other terminal of the switch 48 is connected to the control computer 46. To the terminal to which the control computer 46 is connected, a line 49 of the inspecting substrate section 51 is also connected. The line 49 is branched into two lines. One of the two lines is connected to the inspection connecting terminals a to d of the substrate unit 101, and the other is connected to the inspection connecting terminals a' to d' and e of the substrate unit 102.

The display inspection and the line inspection performed by using the above-described inspection apparatus are specifically described below.

(1) Display inspection:

In the display inspection, a cold-cathode tube is located on the back side of the active matrix substrate of the display device to be inspected, i.e., on the side of the active matrix substrate which does not face the counter substrate. Also, polarizing plates are located so as to sandwich the display device. At this time, one of the polarizing plates located on the active matrix substrate side is disposed between the cold-cathode tube and the active matrix substrate. In this condition, when driving signals are applied from the driving signal input circuit 45 to the display device through the inspection connecting terminals a, b, c, and d on the first substrate 11, and the inspection connecting terminals a', b', c', d', and e on the third substrate 14, the display device comes into a display state. The driving signals are applied to all of the gate bus line terminals, source bus line terminals, and counter electrode common terminals of the display device so as to realize a display the same as an actual display. Herein, the case of Cs-On-Gate type active matrix display device shown in FIG. 10 is described, so that the adjacent terminals 23 of the gate bus lines 24 are supplied with signals having different timings.

For simplifying the construction of the driving signal input circuit 45, signals having the same waveform are supplied to the respective inspection connecting terminals from the driving signal input circuit 45. FIG. 8 shows exemplary driving signals. To the inspection connecting terminals b and c of the first substrate unit 101, the driving signal 31 having a waveform (a) shown in FIG. 8 is applied. The driving signal 31 is applied to the terminals 23 of the odd-numbered gate bus lines 24 of the display device to be inspected, from the respective inspection connecting terminals through the anisotropic conductive film 5a and the inspection lines 4. As a result, the gate bus lines 24 are set into the ON state. Immediately after the odd-numbered gate bus lines 24 are set into the OFF state by the driving signal 31, a driving signal 32 having a waveform (b) shown in FIG. 8 is applied to the terminals 23 of the even-numbered gate bus lines 24 through the inspection connecting terminals a and d of the first substrate unit 101. As a result, alternately to the odd-numbered gate bus lines, the even-numbered gate bus lines are set into the ON state. A driving signal 33 having a waveform (c) in FIG. 8 is applied to all of the source bus lines 22 via the inspection connecting terminals a', b', c', and d' of the second substrate unit 102. As is seen from the figure, during the time period in which all of the gate bus lines 24 are turned ON and then OFF, a fixed level of positive DC voltage signal 33 is applied to all of the source bus lines 22. During the display inspection, a DC voltage signal 34 having a fixed level shown in (d) of FIG. 8 is applied to the inspection connecting terminals e of the second substrate unit 102. The signal 34 is applied to the counter electrodes 28 through the counter electrode common terminals 30.

As described above, when the driving signals 31 to 34 for setting the display device to be inspected into the display state are applied from the driving signal input circuit 45 through the respective inspection connecting terminals, luminescence points and/or lines appear on the display device if there are any failures such as a breakage of a bus line or a short circuit between electrodes of a switching element. The luminescence points and/or lines are observed by eye or detected by an imaging device or the like. Then, the portions including the failures are repaired.

(2) Line inspection:

First, the switch 48 is electrically switched by the control computer 46, so that the resistance measuring device 47 is connected to the substrate inspecting section 51. Hereinafter, as an example of the line inspection, the case where the gate bus lines 24 are to be inspected is described.

In the line inspection, the gate bus lines 24 should be inspected for short circuits between a gate bus line 24 and a source bus line 22, short circuits between the gate bus lines 24, and short circuits between a gate bus line 24 and a counter electrode 28. The respective inspection methods are described below.

In the inspection for any short circuit between a gate bus line 24 and a source bus line 22, respective resistances between the inspection connecting terminals a, b, c, and d of the first substrate unit 101 and the inspection connecting terminals a', b', c', and d' of the second substrate unit 102 are measured. The measuring circuit used for measuring resistance is incorporated in the resistance measuring device 47, and a known measuring circuit can be used. The measuring circuit is not the main purpose of this invention, so that the description thereof is omitted.

Hereinafter, an inspection method for short circuits between a gate bus line 24 and a source bus line 22 will be described, using an exemplary case where resistances between respective pairs of the inspection connecting terminals of the first substrate unit 101 and the inspection connecting terminals of the second substrate unit 102 are measured. It is assumed that the resistance between the inspection connecting terminal a and the inspection connecting terminal a' of the second substrate unit 102 connected to the terminals 21 of the source bus lines 22 is measured. If the resistance value is lower than a usual value, the lower value indicates that any one of the second, sixth, tenth and fourteenth gate bus lines 24 corresponding to the inspection lines (2), (6), (10), and (14) connected to the inspection connecting terminal a is short-circuited with any one of the second, sixth, tenth, and fourteenth source bus lines 22 corresponding to the inspection lines connected to the inspection connecting terminal a'. In such a case, the display device which is inspected is determined to be defective, and the inspection is terminated. If the resistance value between the inspection connecting terminal a and the inspection connecting terminal a' is the usual value, the resistance between the inspection connecting terminal a and the inspection connecting terminal b' are then measured. In this way, resistances between the inspection connecting terminal a and each of the inspection connecting terminals a', b', c', and d' connected to the terminals 21 of the source bus lines 22 are measured, so that the occurrences of any short circuits between the second, sixth, tenth, and fourteenth gate bus lines 24 and all of the source bus lines 22 can be detected.

The inspection related to the four gate bus lines 24 corresponding to the inspection lines connected to the inspection connecting terminal a is terminated, the resistances between the inspection connecting terminal b and each of the inspection connecting terminals a', b', c', and d' are sequentially measured. Thereafter, in the same way, resistances between each of the inspection connecting terminals c and d and each of the inspection connecting terminals a', b', c', and d' are measured. After the occurrence of short circuits between the first to sixteenth gate bus lines 24 and the source bus lines 22 is inspected in the above-described way, the inspection for the next sixteen gate bus lines 24 is performed by the same method. As described above, in the inspection apparatus of this invention, it is unnecessary to bring the contact medium such as a probe into contact with the gate bus line 24 one by one as in the conventional inspection apparatus. Accordingly, the inspection efficiency is significantly improved as compared with the conventional inspection apparatus. Alternatively, the measurements of resistances between respective pairs of the inspection connecting terminals a, b, c, and d and the inspection connecting terminals a', b', c', d', and e are not necessarily performed for each inspection connecting terminal of the first substrate unit 101. For example, the measurements are simultaneously performed for all of the inspection connecting terminals. In such a case, the inspection efficiency can be further enhanced.

In the inspection for short circuits between the gate bus lines 24, the resistances between the adjacent gate bus lines 24 are measured. First, the inspection connecting terminals a and b on the first substrate 11 are short-circuited. At the same time, the inspection connecting terminals c and d are short-circuited. In this condition, the resistance between the short-circuited set of the terminals a and b and the short-circuited set of the terminals c and d is measured. The measurement corresponds to a single measuring step in which the resistance between the terminals a and d and the resistance between the terminals b and c are measured at one time. Depending on the measured resistance values, i.e., depending on the results as to whether or not the measured resistance values are usual values, it is possible to detect any short circuits between a bus line connected to the terminal a and a bus line connected to the terminal d, and any short circuits between a bus line connected to the terminal b and a bus line connected to the terminal c.

Next, in the condition in which the inspection connecting terminals a and d are short-circuited and the inspection connecting terminals b and c are short-circuited, the resistance between the short-circuited set of the terminals a and d and the short-circuited set of the terminals b and c is measured. As a result, it is possible to detect any short circuits between a bus line connected to the terminal a and a bus line connected to the terminal b, and any short circuits between a bus line connected to the terminal c and a bus line connected to the terminal d. In this way, the short circuits between the gate bus lines 24 can be efficiently performed for a predetermined number of gate bus lines 24 which can be connected to the inspection connecting terminals of the first substrate unit 101, e.g., in this example for sixteen gate bus lines 24. In this measurement, if the measured resistance values are usual values, resistances for the next sixteen gate bus lines 24 are measured. If the measured resistance values are not usual values, the inspected display device is determined to be defective.

In the inspection for a short circuit between a gate bus line 24 and a counter electrode 28, the resistances between each of the inspection connecting terminals a, b, c, and d of the first substrate unit 101 and the inspection connecting terminal e of the second substrate unit 102 are measured. The inspection connecting terminals e are connected to the counter electrode common terminals 30 of the display device to be inspected, through the inspecting lines 8, the anisotropic conductive films 5a' and 5b', and the inspection lines 8'. Accordingly, by measuring the resistance between the inspection connecting terminals a and e, it is possible to perform the inspection for the short circuits between the second, sixth, tenth, and fourteenth gate bus lines 24 and the counter electrodes 28. In the same way, the resistances between each of the inspection connecting terminals b, c, and d, and the counter electrode inspection connecting terminal e are measured. After the inspection for short circuits between the first to sixteenth gate bus lines 24 and the counter electrodes 28 is finished, the next sixteen gate bus lines 24 are inspected by the same method.

After the inspection for the gate bus lines 24 is finished, the inspection for the source bus lines 22 is performed in the same way as described above.

As described above, according to the inspection apparatus of the invention, it is possible to perform the display inspection and the line inspection by the same inspection apparatus.

Figure 9:
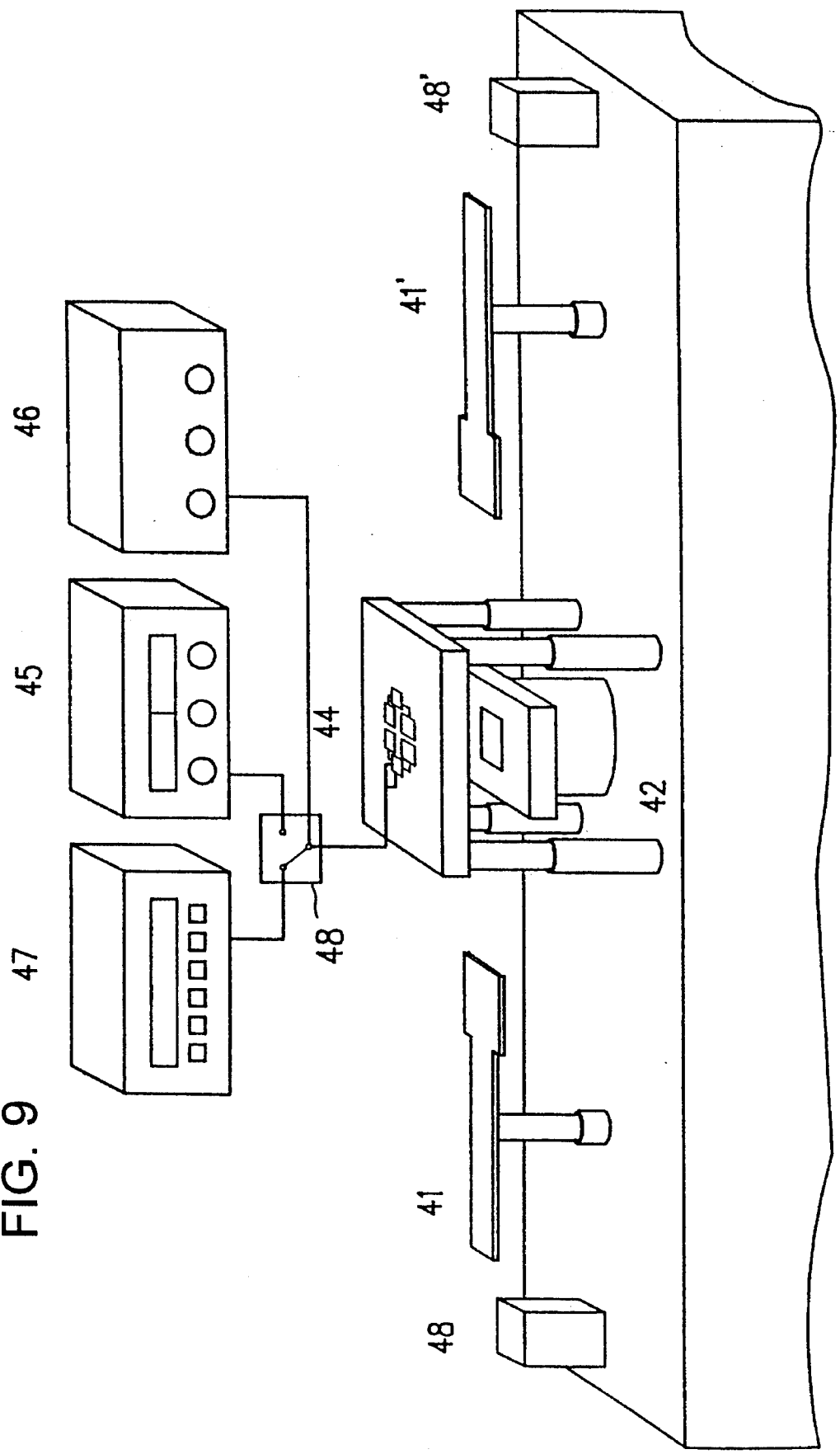
FIG. 9 shows an inspection system including the inspection apparatus of the invention.

Next, by referring to FIG. 9, the inspection method according to the invention is described. FIG. 9 shows an inspection system having the above-described inspection apparatus. The inspection system includes an inspection apparatus having a driving signal input circuit 45, a resistance measuring device 47, and a control computer 46. The inspection system further includes work transporting mechanisms 41 and 41' for transporting a display device to and from the inspection apparatus, a stage 42, and work cassettes 48 and 48'. An inspecting substrate section 51 of the inspection apparatus is fixed above the stage 42. Using the inspection system, the inspection of a display device is described below.

Display devices which have passed through the processes before the inspection process are stacked in the work cassette 48. A display device is transported from the work cassette 48 by the work transporting mechanism 41, and located on the stage 42. As described above, the inspecting substrate section 51 is fixed above the stage 42. The position of the display device on the stage 42 is adjusted with the positions of the substrate units 101 and 102 so that the bus lines 24 and 22 are aligned with the inspection lines 4 and 4', respectively. Specifically, the first substrate unit 101, the second substrate unit 102, and the active matrix substrate 20 are connected as described above by referring to FIG. 7A. As a result, the respective inspection lines 4 on the second substrate 12 of the first substrate unit 101 are directly in contact with the corresponding terminals 23 of the gate bus lines 24. The respective inspection lines 4' on the fourth substrate 14 of the second substrate unit 102 are directly in contact with the corresponding terminals 21 of the source bus lines 22, and the inspection lines 8' are directly in contact with the counter electrode common terminals 30.

After the respective terminals of the display device are connected to the respective inspection terminals of the inspecting substrate section 51, driving signals are applied to the display device through the respective inspection terminals while the inspecting substrate section 51 and the driving signal input circuit 45 are connected. Thus, the display inspection is performed. After the display inspection, the inspecting substrate section 51 is connected to the resistance measuring device 47 under the control of the control computer 46, and the line inspection is performed in accordance with the above-described method. When the line inspection is finished, the display device is transported from the stage 42 to the work cassette 48' by the work transporting mechanism 41'.

As described above, according to the inspection apparatus and the inspection method of the invention, each of the display inspection and the line inspection can be simply and efficiently performed as compared with the conventional example. In addition, the display inspection and the line inspection can be performed by using only one inspection apparatus. Moreover, since a computer is used, it is easily possible to selectively connect one of a signal supplying circuit for the display inspection and a resistance measuring device for the line inspection to the display device under the control of the computer. Thus, the inspection efficiency is significantly improved.

In the above-described example, the first substrate unit 101 is connected to the gate bus lines 24 of the display device, and the second substrate unit 102 is connected to the source bus lines 22. It is appreciated that the same effects can be attained even if the substrate units 101 and 102 are connected in a reverse relationship. Also, it is understood that the pattern of the inspection lines 3 on the first substrate 11 of the first substrate unit 101 and the pattern of the inspection lines 3' on the third substrate 13 of the second substrate unit 102 are not limited to the above described specific examples.

The inspection apparatus and the inspection method of the invention can be applied to a simple matrix type display device and an active matrix type display device using an MIM (Metal-Insulator-Metal) element as a switching element, instead of the above-described active matrix type display device using a TFT. Furthermore, the inspection apparatus and the inspection method of the invention can be applied to an active matrix substrate.

As described above, according to the invention, a set of plural terminals of bus lines of the display device are connected to the inspection terminals of the inspection apparatus. Therefore, it is unnecessary to bring contact media such as contact pins into contact with respective terminals one by one as in the conventional example. With such a construction, bus lines can be inspected set by set for the short circuits therebetween in the line inspection, by changing the combination of the inspection terminals for measuring the resistances. As a result, the line inspection can easily be performed. In addition, the control for selectively connecting one of the driving signal input circuit for the display inspection and the resistance measuring device for the line inspection to the inspection connecting terminals can be electrically provided using a control computer or the like. In this way, the switching from the display inspection to the line inspection can be performed. Accordingly, the display inspection and the line inspection can be successively performed by one inspection apparatus. Therefore, the efficiency of the inspection process including the display inspection and the line inspection as a whole is remarkably improved. Furthermore, since the construction of the inspection apparatus is simple, the production cost of the inspection apparatus can also be suppressed.

Furthermore, after the display device is assembled and cut to have a predetermined size, the display device is checked as to whether the short ring can be properly cut off or not, using the inspection apparatus or the inspection method according to the invention. Therefore, it is possible to avoid defective display devices in which the short ring is not properly cut off from being sent to the subsequent process.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An apparatus for inspecting a display device including an active matrix substrate, a counter substrate, and a display medium interposed between the active matrix substrate and the counter substrate, the active matrix substrate having a plurality of first bus lines and a plurality of second bus lines formed thereon, the apparatus comprising:

a first substrate unit including a plurality of first inspection terminals, a plurality of first inspection lines, a plurality of second inspection lines, and first supporting means including first and second faces for supporting the first inspection terminals and the first and second inspection lines, each of the first inspection lines being connected to one of the first inspection terminals, the second inspection lines being provided on the second face of the first supporting means which is different from the first face thereof on which the first inspection lines are provided, each of the second inspection lines being selectively connected to one of the first inspection lines by first connecting means, wherein when the second inspection lines are brought directly in contact with the first bus lines, each of the first bus lines is connected to one of the first inspection terminals;

a second substrate unit including a plurality of second inspection terminals, a plurality of third inspection lines, a plurality of fourth inspection lines, and second supporting means including third and fourth faces for supporting the second inspection terminals and the third and fourth inspection lines, each of the third inspection lines being connected to one of the second inspection terminals, the fourth inspection lines being provided on the fourth face of the second supporting means which is different from the third face thereof on which the third inspection lines are provided, each of the fourth inspection lines being selectively connected to one of the third inspection lines by second connecting means, wherein when the fourth inspection lines are brought directly in contact with the second bus lines, each of the second bus lines is connected to one of the second inspection terminals;

driving signal input means for supplying driving signals for performing a display inspection of the display device to the first inspection terminals and the second inspection terminals;

resistance measuring means for measuring resistances of the first bus lines and the second bus lines of the display device; and means for connecting either of the driving signal input means or the resistance measuring means to the first substrate unit and the second substrate unit.

2. An apparatus according to claim 1, wherein the first supporting means comprises a first substrate including said first face and a second substrate including said second face, the first inspection terminals and the first inspection lines being provided on the first face, the second inspection lines being provided on the second face, the first substrate and the second substrate being disposed to allow the first inspection lines to face the second inspection lines, and a conductive film as the first connecting means being formed between the first substrate and the second substrate.

3. An apparatus according to claim 2, wherein the second supporting means comprises a third substrate including said third face and a fourth substrate including said fourth face, the second inspection terminals and the third inspection lines being provided on the third face, the fourth inspection lines being provided on the fourth face, the third substrate and the fourth substrate being disposed to allow the third inspection lines to face the fourth inspection lines, and a conductive film as the second connecting means being formed between the third substrate and the fourth substrate.

4. An apparatus according to claim 3, wherein the number of the first inspection terminals is predetermined, the first inspection lines are divided into groups, the number of groups being equal to the predetermined number of the first inspection terminals, and each group of the first inspection lines is connected to one first inspection terminal which is different from a first inspection terminal to which any other group of the first inspection lines is connected.

5. An apparatus according to claim 4, wherein the number of the second inspection terminals is predetermined, the third inspection lines are divided into groups, the number of groups being equal to the predetermined number of the second inspection terminals, and each group of the third inspection lines is connected to one second inspection terminal which is different from a second inspection terminal to which any other group of the third inspection lines is connected.

6. An apparatus according to claim 5, wherein the second inspection lines and the fourth inspection lines are formed at the same pitches as those of the first bus lines and the second bus lines, respectively.

7. A method for inspecting a display device using the inspection apparatus according to claim 1, the method comprising the steps of:

connecting said first substrate unit of said apparatus to the display device to align said second inspection lines of the first substrate unit and said first bus lines of said active matrix substrate, and connecting said second substrate unit of said apparatus to the display device to align said fourth inspection lines of said second substrate unit and the second bus lines of said active matrix substrate; and switching a mode of the inspection apparatus between a mode for checking the display device as to a display state thereof and a mode for measuring resistances between the first bus lines and the second bus lines.

8. An apparatus for inspecting a display device including an active matrix substrate, a counter substrate, and a display medium interposed between the active matrix substrate and the counter substrate, the active matrix substrate having a plurality of bus lines which are formed thereon, the apparatus comprising:

at least one substrate unit including a plurality of inspection terminals, a plurality of first inspection lines, a plurality of second inspection lines, and first and second substrates, each of the first inspection lines being connected to one of the inspection terminals, the first inspection lines being provided on the first substrate, the second inspection lines being provided on the second substrate, each of the second inspection lines being selectively connected to one of the first inspection lines by a conductive film, wherein when the second inspection lines are brought directly in contact with the bus lines, each of the bus lines is connected to one of the inspection terminals;

driving signal input means for supplying driving signals for performing a display inspection of the display device to the inspection terminals;

resistance measuring means for measuring resistances of the bus lines of the display device; and means for connecting either of the driving signal input means or the resistance measuring means to the substrate unit.

9. An apparatus according to claim 8, wherein the at least one substrate unit includes two substrate units.

10. An apparatus according to claim 8, wherein the number of the second inspection lines being equal to the number of the first inspection lines, and the second inspection lines are arranged at a pitch equal to a pitch of the first inspection lines.

11. An apparatus according to claim 8, wherein the number of the first inspection terminals is predetermined, the first inspection lines are divided into groups, the number of groups being equal to the predetermined number of the inspection terminals, and each group of the first inspection lines is connected to one inspection terminal which is different from an inspection terminal to which any other group of the first inspection lines is connected.

* * * * *